United States Patent
Moore et al.

(10) Patent No.: US 10,427,740 B2
(45) Date of Patent: Oct. 1, 2019

(54) SPLIT OUTER SIDE PANEL JIG AND SYSTEM

(71) Applicant: Honda Motor Co., Ltd., Tokyo (JP)

(72) Inventors: William R Moore, Barrie (CA); David P Tracey, Oro-Meddonte (CA); John McQueen, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 433 days.

(21) Appl. No.: 14/919,376

(22) Filed: Oct. 21, 2015

(65) Prior Publication Data
US 2017/0113746 A1    Apr. 27, 2017

(51) Int. Cl.
*F16M 13/02*    (2006.01)
*B62D 65/18*    (2006.01)
(Continued)

(52) U.S. Cl.
CPC .......... *B62D 65/18* (2013.01); *B25H 1/0007* (2013.01); *F16B 47/00* (2013.01); *F16M 13/02* (2013.01); *B23K 37/047* (2013.01); *B23K 37/0443* (2013.01); *B23K 2101/006* (2018.08); *B23P 2700/50* (2013.01); *B62D 65/02* (2013.01);
(Continued)

(58) Field of Classification Search
CPC ...... B62D 65/18; B62D 65/02; B62D 65/026; B62D 65/022; B62D 65/024; F16B 47/00; F16M 13/02; F16M 11/041; B23K 37/047; B23K 37/0443; B23P 2700/50; Y10T 29/49829; Y10T 29/49622; Y10T 29/49895; Y10T 29/53539; Y10T 29/53961; C25D 17/06; B05B 13/0284; B05B 13/0285; A47B 43/00–65/00; A47B 73/00; A47B 81/00; A47B 87/00; A47B 96/00; A47F 1/00; A47F 5/00; A47F 7/00; A47G 25/00–25/12; A47L 15/05
USPC ............. 248/221.12, 222.41; 29/281.6, 430, 29/890.04, 892.3, 17.1, 824; 228/4.1,
(Continued)

(56) References Cited

U.S. PATENT DOCUMENTS 1,835,042 A * 12/1931 Hammer ................ A47G 1/166
                                                                 16/254
3,029,952 A *  4/1962 Bagdon .................. B65G 17/20
                                                                 211/117
(Continued)

FOREIGN PATENT DOCUMENTS

JP    05147457    *  6/1993
JP    H05147457   *  6/1993
(Continued)

*Primary Examiner* — Monica S Carter
*Assistant Examiner* — Mahdi H Nejad
(74) *Attorney, Agent, or Firm* — Honda Patents & Technologies North America, LLC; Mark E. Duell (57) ABSTRACT

A system for hanging a split outer side panel on a rack in a manufacturing environment, the split outer side panel includes a first part having a rear section, a top section, and a rear portion of a side sill, and a second part having an A-pillar, a B-pillar, and a front portion of the side sill. The system includes a jig for hanging the first part of the split outer side panel. The jig includes a first keyhole pin extending from a first surface of the jig, the first keyhole pin being received by a first keyhole in the first part, and a second keyhole pin extending from a first surface of the jig, the second keyhole pin being received by a second keyhole in the first part.

8 Claims, 11 Drawing Sheets

(51) Int. Cl.
*F16B 47/00* (2006.01)
*B25H 1/00* (2006.01)
*B62D 65/02* (2006.01)
*B23K 101/00* (2006.01)
*B62D 65/06* (2006.01)
*B23K 37/04* (2006.01)
*B23K 37/047* (2006.01)

(52) U.S. Cl.
CPC ............ *B62D 65/026* (2013.01); *B62D 65/06* (2013.01); *Y10T 29/49622* (2015.01); *Y10T 29/49826* (2015.01); *Y10T 29/49895* (2015.01)

(58) Field of Classification Search
USPC ................ 228/49.1; 219/80; 296/36, 193.05, 296/193.06, 35.4, 209; 312/184; 269/53
See application file for complete search history.

(56) References Cited

U.S. PATENT DOCUMENTS

| | | | |
|---|---|---|---|
| 3,159,368 A * | 12/1964 | Ahlbin | B66D 3/02 224/520 |
| 3,271,059 A * | 9/1966 | Pearson | F16B 5/06 24/453 |
| 3,346,126 A * | 10/1967 | Bloom | A47B 57/487 211/192 |
| 3,880,396 A * | 4/1975 | Freiberger | F16B 21/02 24/580.11 |
| 3,986,318 A * | 10/1976 | McConnell | F16B 12/34 403/384 |
| 4,667,866 A | 5/1987 | Tobita et al. | |
| 4,991,707 A | 2/1991 | Alexander et al. | |
| 5,011,068 A | 4/1991 | Stoutenburg et al. | |
| 5,123,161 A | 6/1992 | Kubo et al. | |
| 5,131,620 A * | 7/1992 | Boundy | A47B 21/0314 248/225.11 |
| 5,374,799 A | 12/1994 | Nishimoto et al. | |
| 5,400,943 A | 3/1995 | Rossi | |
| 5,427,300 A | 6/1995 | Quagline | |
| 5,433,783 A * | 7/1995 | Ichinose | B65G 49/0459 118/416 |
| 5,499,451 A * | 3/1996 | Krivda | B61D 17/04 228/49.1 |
| 5,697,752 A | 12/1997 | Dugas et al. | |
| 5,716,154 A * | 2/1998 | Miller | B60R 11/00 403/22 |
| 5,738,020 A * | 4/1998 | Correia | A47B 95/008 109/51 |
| 5,902,496 A | 5/1999 | Alborante | |
| 6,065,200 A | 5/2000 | Negre | |
| 6,106,052 A * | 8/2000 | Shaw | B60P 7/0807 248/222.41 |
| 6,123,314 A * | 9/2000 | Steele | F16B 5/0642 248/222.11 |
| 6,170,732 B1 | 1/2001 | Vogt et al. | |
| 6,193,142 B1 | 2/2001 | Segawa et al. | |
| 6,293,454 B1 | 9/2001 | Zhang et al. | |
| 6,311,789 B1 * | 11/2001 | Saxman | E21B 19/18 175/57 |
| 6,339,874 B2 * | 1/2002 | Segawa | B23P 21/004 29/824 |
| 6,389,698 B1 * | 5/2002 | Malatier | B62D 65/00 269/289 R |
| 6,467,675 B1 | 10/2002 | Ozaku et al. | |
| 6,536,091 B1 * | 3/2003 | Brown | A47H 7/02 160/196.1 |
| 6,643,905 B2 * | 11/2003 | Rhoads | B62D 65/06 269/50 |
| 6,899,377 B2 | 5/2005 | Ghuman et al. | |
| 6,918,577 B2 | 7/2005 | Ghuman et al. | |
| 7,178,227 B2 | 2/2007 | Ghuman et al. | |
| 7,401,757 B2 * | 7/2008 | Lomp | B60H 1/00535 224/319 |
| 7,604,307 B2 * | 10/2009 | Greenwald | A47B 88/49 312/333 |
| 7,677,428 B2 | 3/2010 | Kilibarda | |
| 7,951,724 B2 * | 5/2011 | Fyten | H01L 21/68728 118/503 |
| 8,365,381 B2 * | 2/2013 | Carter | B62D 65/06 29/407.1 |
| 8,382,195 B2 | 2/2013 | Iwase et al. | |
| 9,321,091 B2 * | 4/2016 | Tsuchiya | B21D 22/02 |
| 9,806,583 B2 * | 10/2017 | Norris | H02K 5/26 |
| 2004/0211738 A1 * | 10/2004 | Priefert | B68C 1/002 211/85.11 |
| 2007/0114709 A1 * | 5/2007 | Sawada | B62D 25/145 269/47 |
| 2008/0136214 A1 * | 6/2008 | Harrison, III | B62D 65/06 296/107.17 |
| 2010/0287767 A1 * | 11/2010 | Woo | B23P 21/004 29/823 |
| 2011/0160905 A1 * | 6/2011 | Asamizu | B25J 15/0019 700/258 |
| 2011/0203212 A1 * | 8/2011 | Matys | B28B 23/005 52/562 |
| 2012/0061894 A1 * | 3/2012 | Cahill | B25B 11/02 269/37 |
| 2014/0165388 A1 | 6/2014 | Kim et al. | |
| 2017/0165826 A1 * | 6/2017 | Baskar | B05B 13/0292 |
| 2017/0355566 A1 * | 12/2017 | Miller | F16M 13/02 |

FOREIGN PATENT DOCUMENTS

| | | | |
|---|---|---|---|
| KR | 101467674 | * | 4/2013 |
| KR | 101467674 | * | 11/2014 |
| WO | WO 2009145480 | * | 12/2009 |
| WO | WO 2015060131 | * | 4/2015 |

* cited by examiner

SPLIT OUTER SIDE PANEL JIG AND SYSTEM

BACKGROUND

Conventional body outer side panels of motor vehicles are a closed loop design, wherein the body outer side panel is one piece including a rear section, a top section, a side sill, a B-pillar, and an A-pillar.

During the manufacturing process, the body outer side panels are lifted, transferred, and stored by hanging the body outer side panels either vertically or horizontally, such as by passing support arms through openings in the body outer side panels.

The body side outer panels are generally balanced based on their shape for easy transport or storage. However, there is a desire to provide a two part body side outer panel that includes one part with the rear section, top section, and a rear portion of the side sill, and the other part with the A-pillar, the B-pillar, and the front portion of the side sill. These parts do not balance on the lifts and storage racks.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to an aspect of the system for hanging a split outer side panel on a rack in a manufacturing environment, the split outer side panel includes a first part having a rear section, a top section, and a rear portion of a side sill, and a second part having an A-pillar, a B-pillar, and a front portion of the side sill. The system includes a jig for hanging the first part of the split outer side panel. The jig includes a first keyhole pin extending from a first surface of the jig, the first keyhole pin being received by a first keyhole in the first part, and a second keyhole pin extending from a first surface of the jig, the second keyhole pin being received by a second keyhole in the first part.

According to another aspect of the system for hanging a part on a rack in a manufacturing environment, the system includes a jig for hanging the part. The jig includes a first keyhole pin extending from a first surface of the jig, the first keyhole pin being received by a first keyhole in the part, and a second keyhole pin extending from a first surface of the jig, the second keyhole pin being received by a second keyhole in the part.

According to yet another aspect, a jig for hanging a split outer side panel on a rack in a manufacturing environment is disclosed. The split outer side panel includes a first part having a rear section, a top section, and a rear portion of a side sill, and a second part having an A-pillar, a B-pillar, and a front portion of the side sill. The jig includes a first keyhole pin extending from a first surface of the jig, the first keyhole pin being received by a first keyhole in the first part, and a second keyhole pin extending from a first surface of the jig, the second keyhole pin being received by a second keyhole in the first part.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
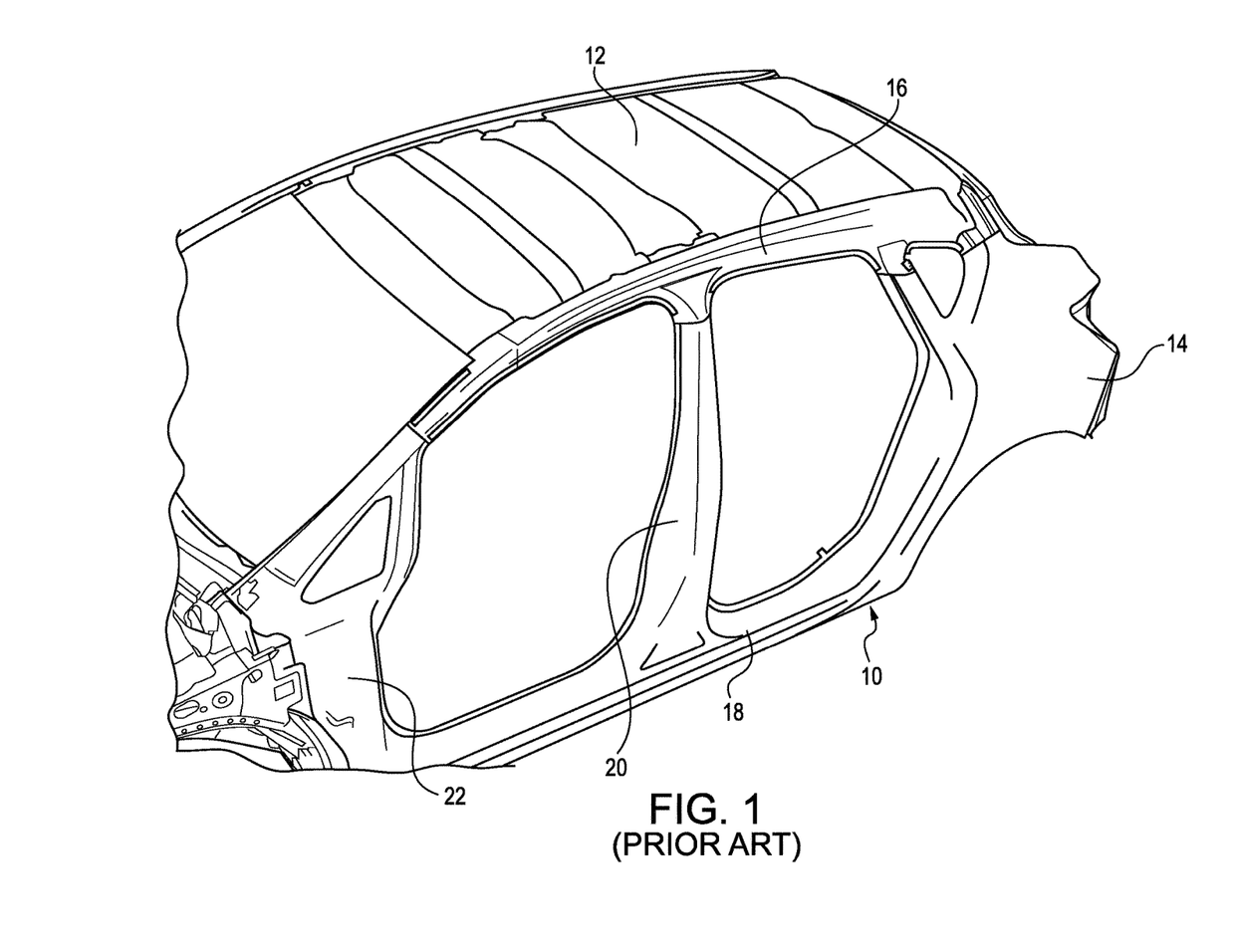
FIG. 1 is a perspective view of a prior art body outer side panel.
Figure 2:
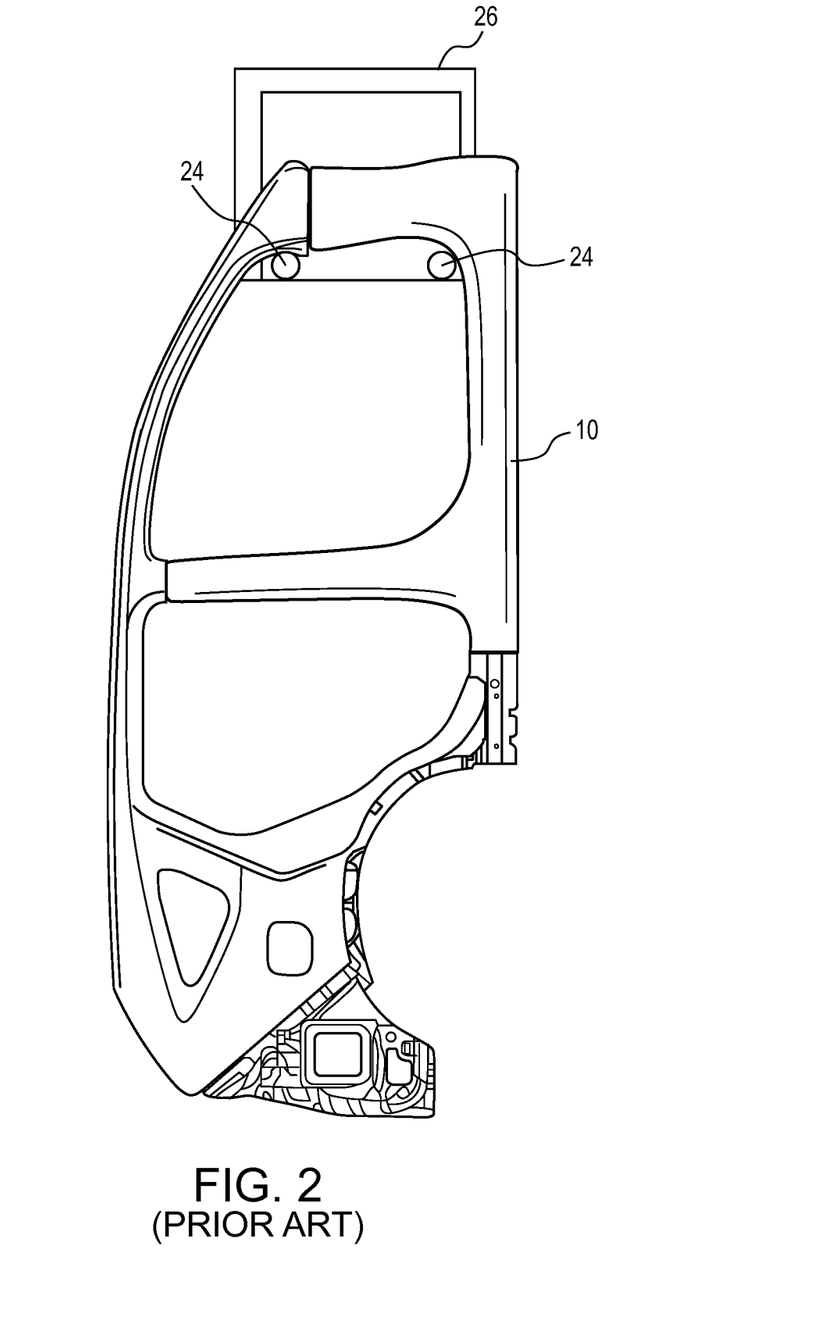
FIG. 2 is an embodiment of a prior art body outer side panel vertically hung on a rack.
Figure 3:
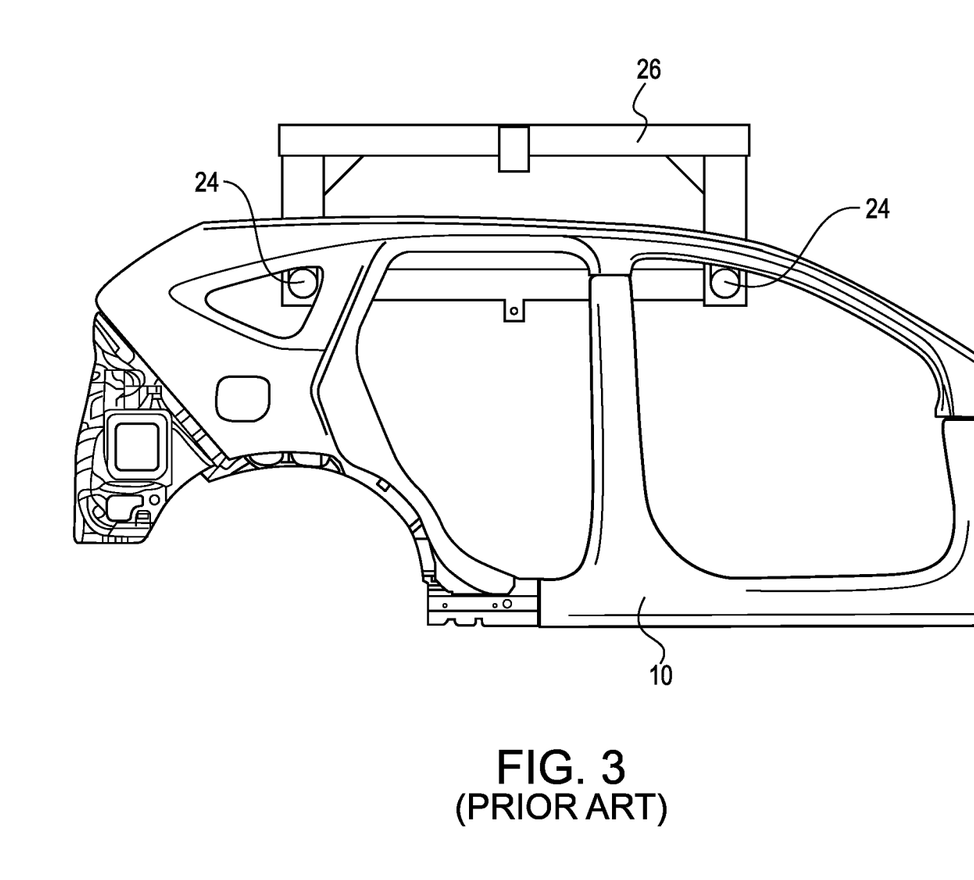
FIG. 3 is an embodiment of a prior art body outer side panel horizontally hung on a rack.

As shown in FIG. 1, a conventional, prior art body outer side panel 10 of a motor vehicle 12 is a closed loop design, wherein the body outer side panel 10 is one piece including a rear section 14, a top section 16, a side sill 18, a B-pillar 20, and an A-pillar 22. During the manufacturing process, the body outer side panel 10 is lifted, transferred, and stored by hanging the body outer side panel 10 either vertically, as shown in FIG. 2, or horizontally, as shown in FIG. 3, by passing support arms 24 of a rack 26 through openings 28 in the body outer side panel 10.

Figure 4:
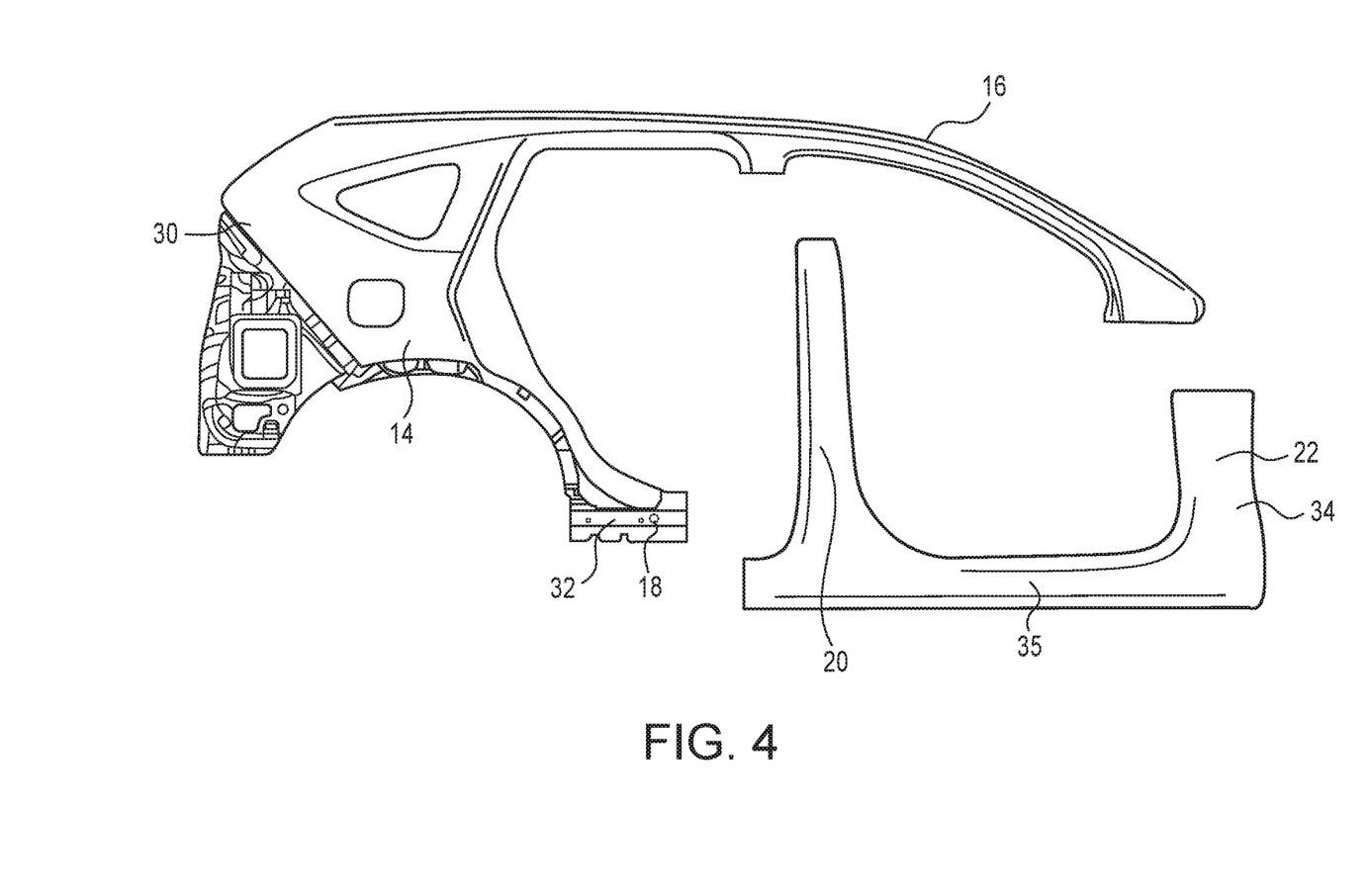
FIG. 4 is an embodiment of a two-part body outer side panel.

The body outer side panel 10 is generally balanced based on its shape for easy transport or storage. However, as shown in FIG. 4, some modern constructions include a two part body side outer panel 10 that includes a first part 30 with the rear section 14, top section 16, and a rear portion 32 of the side sill 18, and a second part 34 with the A-pillar 22, the B-pillar 20, and the front portion 35 of the side sill 18.

Figure 5:
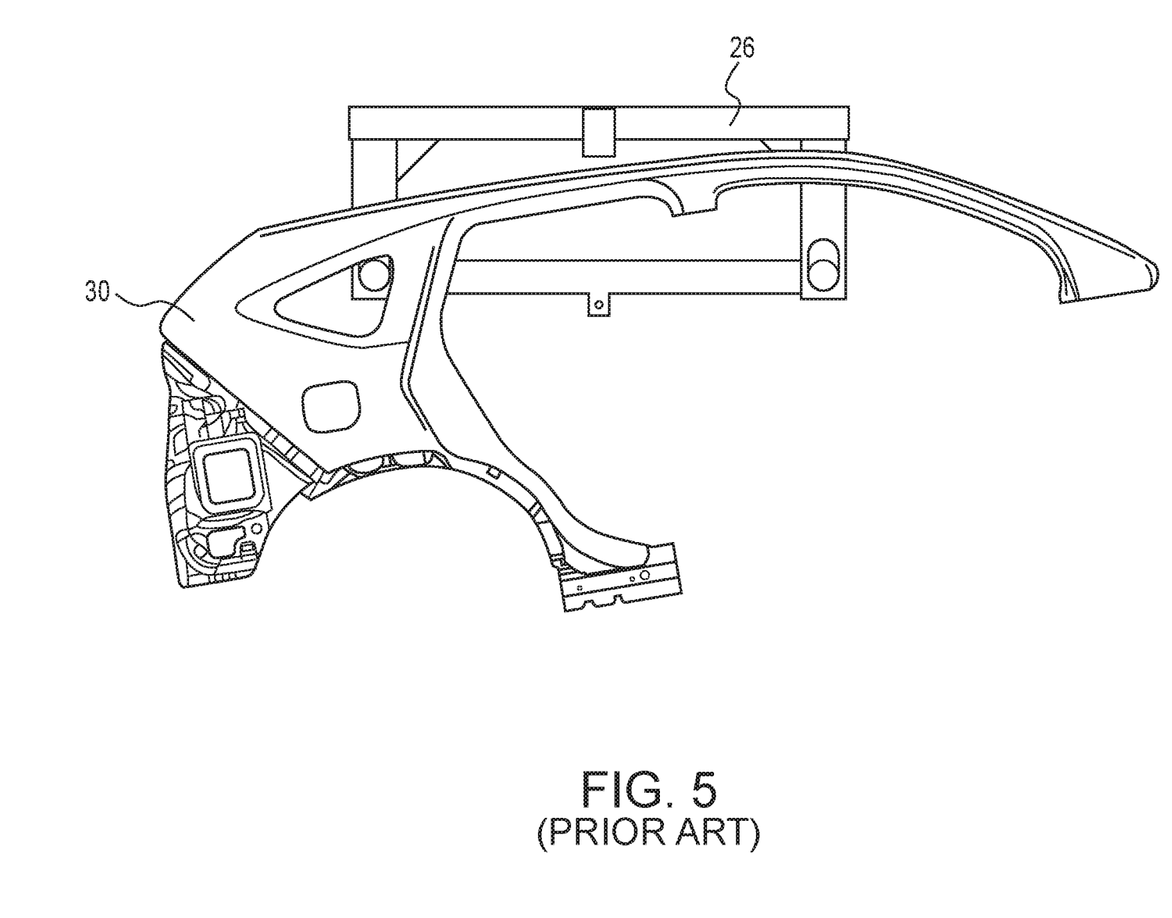
FIG. 5 is an embodiment of a first part of a two-part body outer side panel horizontally hung on a rack.

As shown in FIG. 5, these parts do not balance on the storage rack 26. With the mass of the second part 34 removed, the first part 30 is no longer stably balanced on the rack 26.

Figure 6:
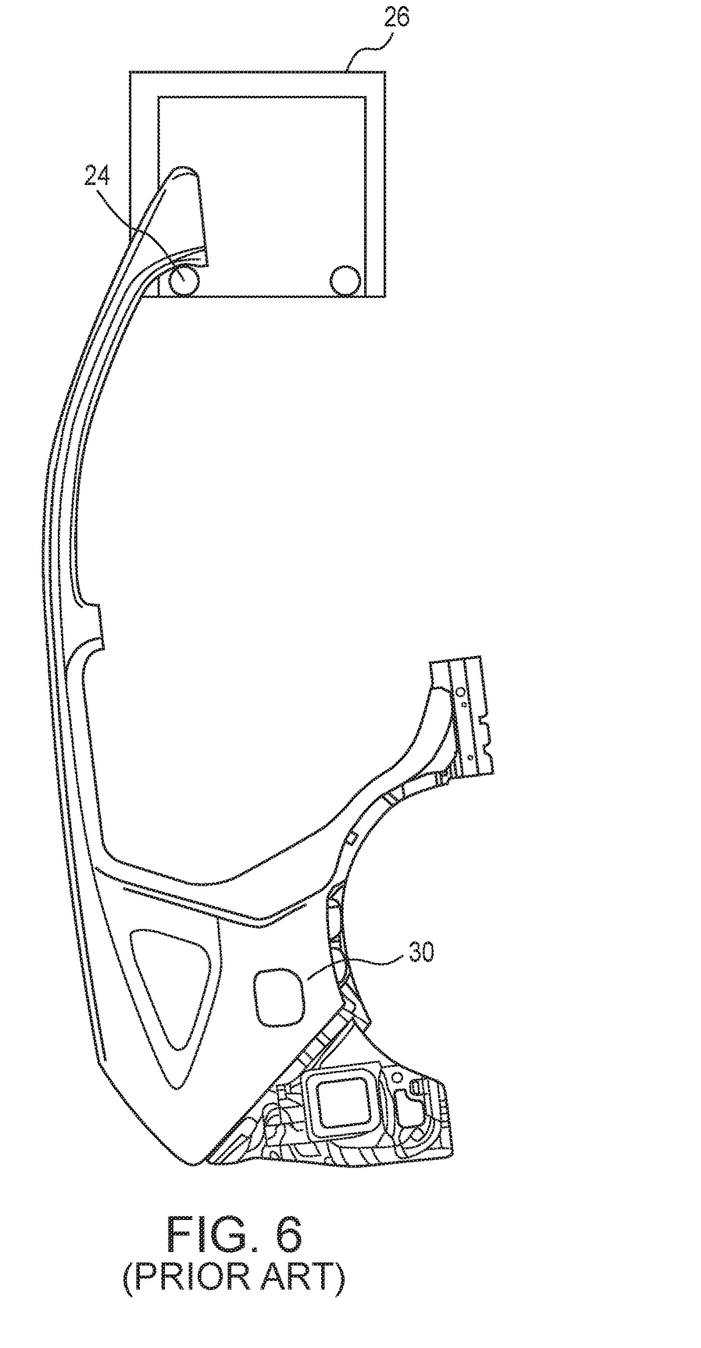
FIG. 6 is an embodiment of a first part of a two-part body outer side panel vertically hung on a rack.

In the embodiment shown in FIG. 6, in the case of attempting to vertically hang the first part 30, the balance problem is even greater than the embodiment shown in FIG. 5, with first part 30 only contacting one of the support arms 24 of the rack 26.

Figure 7:
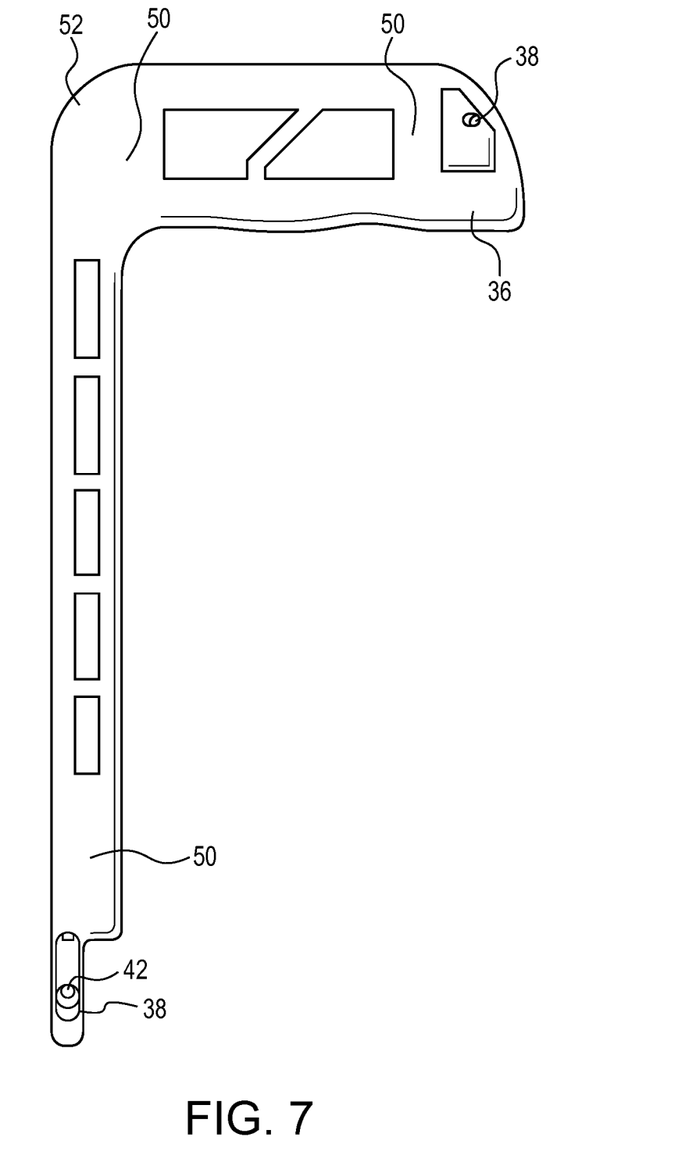
FIG. 7 is a side front view of a jig for hanging a first part of a two-part body outer side panel on a rack.
Figure 8:
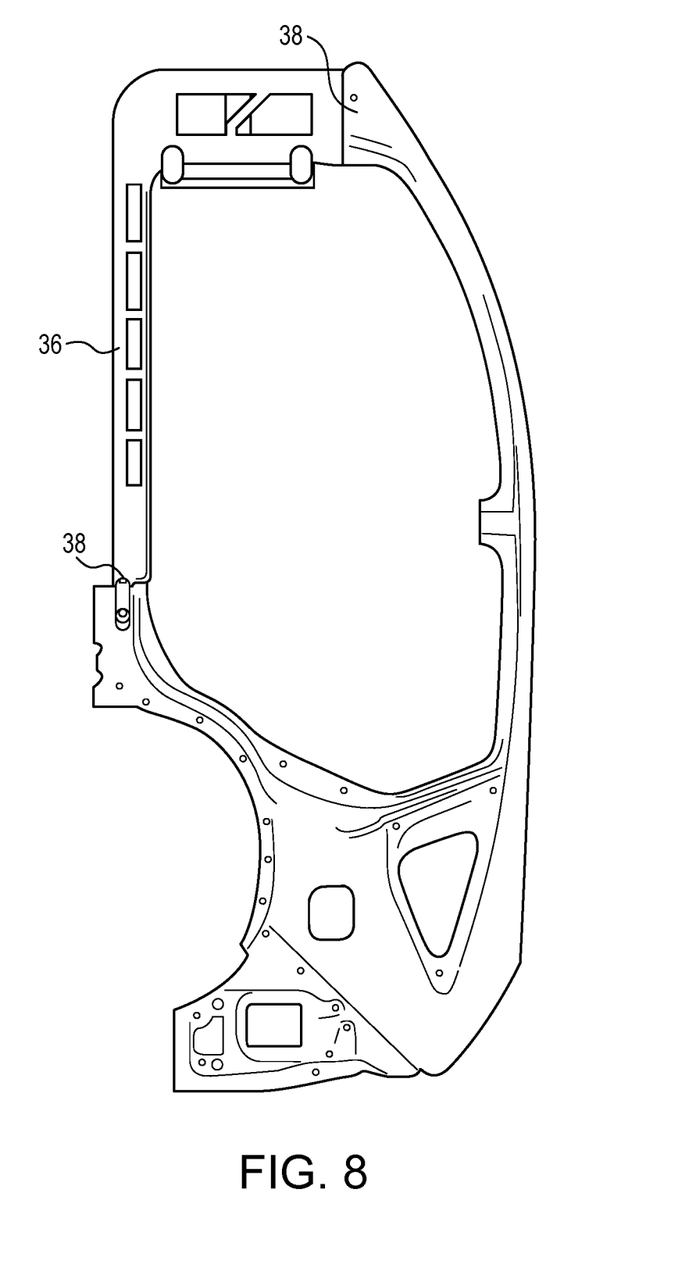
FIG. 8 is a side front view of an embodiment of a jig and a first part of a two-part body outer side panel vertically hung on a rack.
Figure 9:
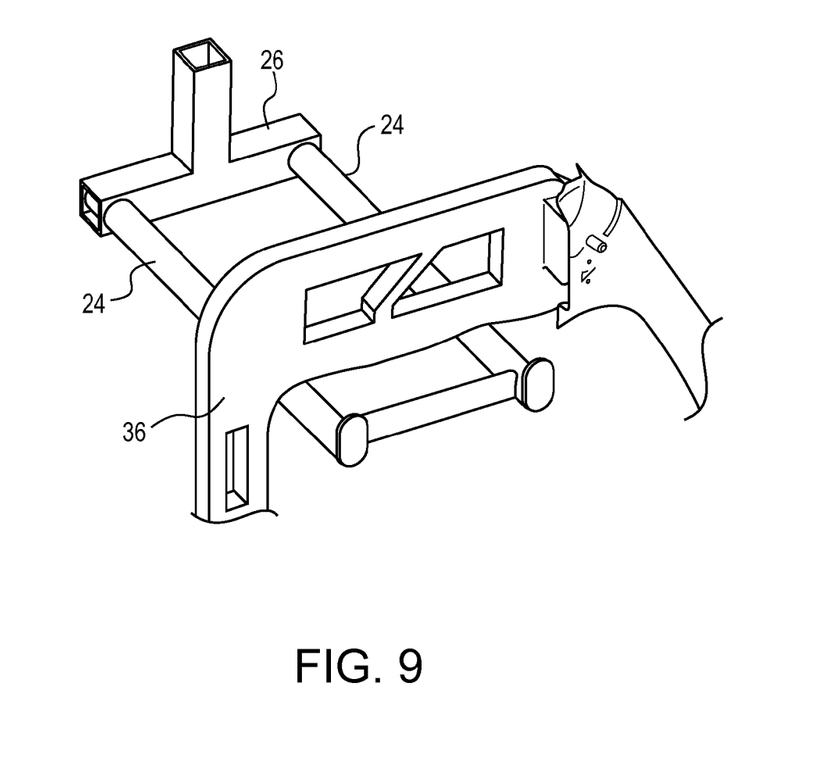
FIG. 9 is a perspective front view of a portion of a jig and a first part of a two-part body outer side panel vertically hung on a rack.

To solve the balance problem, as shown in FIGS. 7-9, a jig 36 is provided that is removably coupled to the corresponding first part 30 to balance the first part 30 on the support arms 24 of the rack 26 for shipping and storage.

Figure 10:
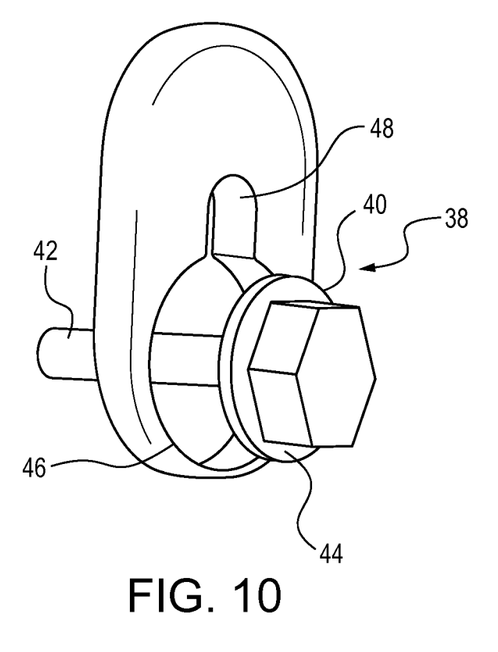
FIG. 10 is a close up perspective view of a gravitational joint.

The jig 36 may be coupled to the first part 30 using a gravitational joint 38. As shown in FIG. 10, the gravitational joint 38 preferably includes a keyhole shape opening 40 in the first part 30 that receives a pin 42 with a head 44 to secure the jig 36 to the first part 30 while allowing the jig 36 to be easily removed during manufacture of the vehicle. The lower opening 46 in the key shape opening 40 is large enough to receive the head 44 of the pin 42, and when the first part 30 is released, gravity pulls the first part 30 downward, causing the pin 42 to move into the upper opening 48 of the gravitational joint 38. Because the upper opening 48 of the gravitational joint 38 is wide enough to accommodate the pin 42, the pin 42 moves freely into the upper opening 48 of the gravitational joint 38. However, the upper opening 48 is narrower than the head 44 of the pin 42, thereby providing an interference fit that prevents the first part 30 from being removed from the jig 36 until such time that the first part 30 is lifted, and the pin 42 moves from the upper opening 48 to the lower opening 46, thereby allowing the pin 42 and head 44 to be removed from the gravitational joint 38 through the lower opening 46. The pin 42 may be formed integrally with the jig 36, or the pin 42 may be a separate part attached to the jig 36, such as a bolt, a rivet, or any other suitable connector with a wider head 44 at the top.

Figure 11:
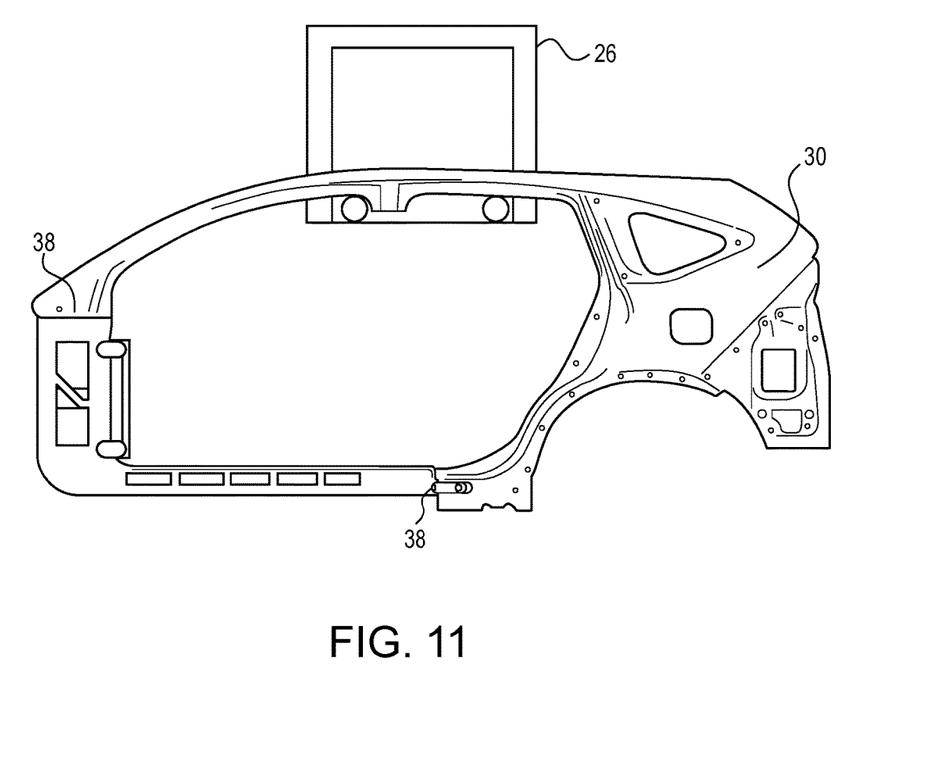
FIG. 11 is a side front view of an embodiment of a jig and a first part of a two-part body outer side panel horizontally hung on a rack.

FIG. 11 shows an alternate embodiment in which the first part 30 is hanged on the rack 26 in a horizontal manner. In the embodiment illustrated in FIG. 11, the gravitational joints 38 are oriented in a manner in so that upper opening 48 is above the lower opening 46 as the jig 36 is oriented horizontally.

As illustrated in FIG. 7, the jig 36 includes flat and smooth vacuum suction cup surfaces 50 for robotic handling of the jig 36.

As further illustrated in FIGS. 7 and 8, the jig 36 further includes an engineered zone 52 that may be altered to add or remove mass to properly balance the first part 30 when the jig 36 is attached. The jig 36 may be made with the an appropriate mass in the engineered zone 52 to balance the first part 30, or standard jig 36 may be used with the ability to add or remove weights in a manner known to one skilled in the art.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A system for hanging a split outer side panel on a rack in a manufacturing environment; the split outer side panel comprising a first part having a rear section, a top section, and a rear portion of a side sill, and a second part having an A-pillar, a B-pillar, and a front portion of the side sill; the system comprising:
    a jig for hanging the first part of the split outer side panel, wherein the jig replaces the second part in the manufacturing environment, and wherein the jig connects a free end of the rear portion of the side sill and a free end of the top section, thereby creating an opening that encircles a portion of the rack on which the split outer side panel is hanging, the jig comprising:
        a first keyhole pin extending from a first surface of the jig, the first keyhole pin being received by a first keyhole in the first part; and
        a second keyhole pin extending from the first surface of the jig, the second keyhole pin being received by a second keyhole in the first part.

2. The system of claim 1, wherein the jig further comprises:
    an engineered zone for receiving counterweights to balance the jig and the first part when holding the first part on the rack.

3. The system of claim 1, wherein the jig further comprises:
    an engineered zone to balance the jig when holding the first part on the rack, the engineered zone having a mass sufficient to balance the jig and the first part.

4. The system of claim 1, wherein the jig further comprises:
    at least one vacuum suction cup receiving surface on the jig.

5. A jig for hanging a split outer side panel on a rack in a manufacturing environment; the split outer side panel comprising a first part having a rear section, a top section, and a rear portion of a side sill, and a second part having an A-pillar, a B-pillar, and a front portion of the side sill; the jig comprising:
    a first keyhole pin extending from a first surface of the jig, the first keyhole pin being received by a first keyhole in the first part;
    a second keyhole pin extending from the first surface of the jig, the second keyhole pin being received by a second keyhole in the first part;
    wherein the jig replaces the second part in the manufacturing environment; and
    wherein the jig connects a free end of the rear portion of the side sill and a free end of the top section, thereby creating an opening that encircles a portion of the rack on which the split outer side panel is hanging.

6. The jig of claim 5 further comprising:
    an engineered zone for receiving counterweights to balance the jig and the first part when holding the first part on the rack.

7. The jig of claim 5 further comprising:
    an engineered zone to balance the jig when holding the first part on the rack, the engineered zone having a mass sufficient to balance the jig and the first part.

8. The jig of claim 5 further comprising:
    at least one vacuum suction cup receiving surface on the jig.

* * * * *